United States Patent
Schrage

(10) Patent No.: US 8,453,817 B2
(45) Date of Patent: Jun. 4, 2013

(54) HYBRID DRIVE TRAIN

(75) Inventor: Henrik Schrage, Weinsberg (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 222 days.

(21) Appl. No.: 12/789,489

(22) Filed: May 28, 2010

(65) Prior Publication Data

US 2010/0326785 A1   Dec. 30, 2010

(30) Foreign Application Priority Data

Jun. 24, 2009   (DE) .................. 10 2009 030 135

(51) Int. Cl.
*F16D 25/10* (2006.01)
*F16D 13/72* (2006.01)

(52) U.S. Cl.
USPC ............... 192/48.611; 192/70.12; 192/85.61; 310/78

(58) Field of Classification Search
USPC .................. 192/48.612, 48.611; 180/65.1
See application file for complete search history.

(56) References Cited

U.S. PATENT DOCUMENTS

| | | |
|---|---|---|
| 6,354,974 B1 | 3/2002 | Kozarekar |
| 6,455,968 B2 | 9/2002 | Honorio et al. |
| 6,736,228 B2 | 5/2004 | Donohue et al. |
| 7,293,637 B2 * | 11/2007 | Janson et al. ............ 192/48.611 |
| 7,798,030 B2 | 9/2010 | Lang et al. |
| 2006/0144665 A1 * | 7/2006 | Janson et al. ............... 192/48.8 |
| 2007/0089962 A1 | 4/2007 | Enstrom |
| 2007/0108857 A1 | 5/2007 | Nomura et al. |
| 2007/0125615 A1 * | 6/2007 | Okada et al. .............. 192/87.11 |
| 2007/0204119 A1 | 8/2007 | Murotani et al. |
| 2008/0047799 A1 | 2/2008 | Combes et al. |
| 2009/0283344 A1 | 11/2009 | Arnold et al. |

FOREIGN PATENT DOCUMENTS

| | | |
|---|---|---|
| EP | 1 112 884 | 9/2003 |
| JP | 2006211795 | 8/2006 |
| JP | 2006298272 | 11/2006 |
| WO | 2008/092426 | 8/2008 |

* cited by examiner

*Primary Examiner* — David D Le
*Assistant Examiner* — Stacey Fluhart
(74) *Attorney, Agent, or Firm* — Gerald E. Hespos; Michael J. Porco; Matthew T. Hespos

(57) ABSTRACT

A hybrid drive train (1) has an electric machine (15) with a stator (16) fastened to a clutch housing (18) and a rotor (20) that can be rotated relative to the stator (16) with a radial gap (22) therebetween. The hybrid drive train (1) also has a wet-running multiple disk clutch device (8) with an outer multiple disk carrier (24) that has at least one oil passage opening (41). The radial gap (22) between the rotor (20) and the stator (16) is shielded from the oil passage opening (41) of the outer multiple disk carrier (24) by an oil shielding device (50).

7 Claims, 1 Drawing Sheet

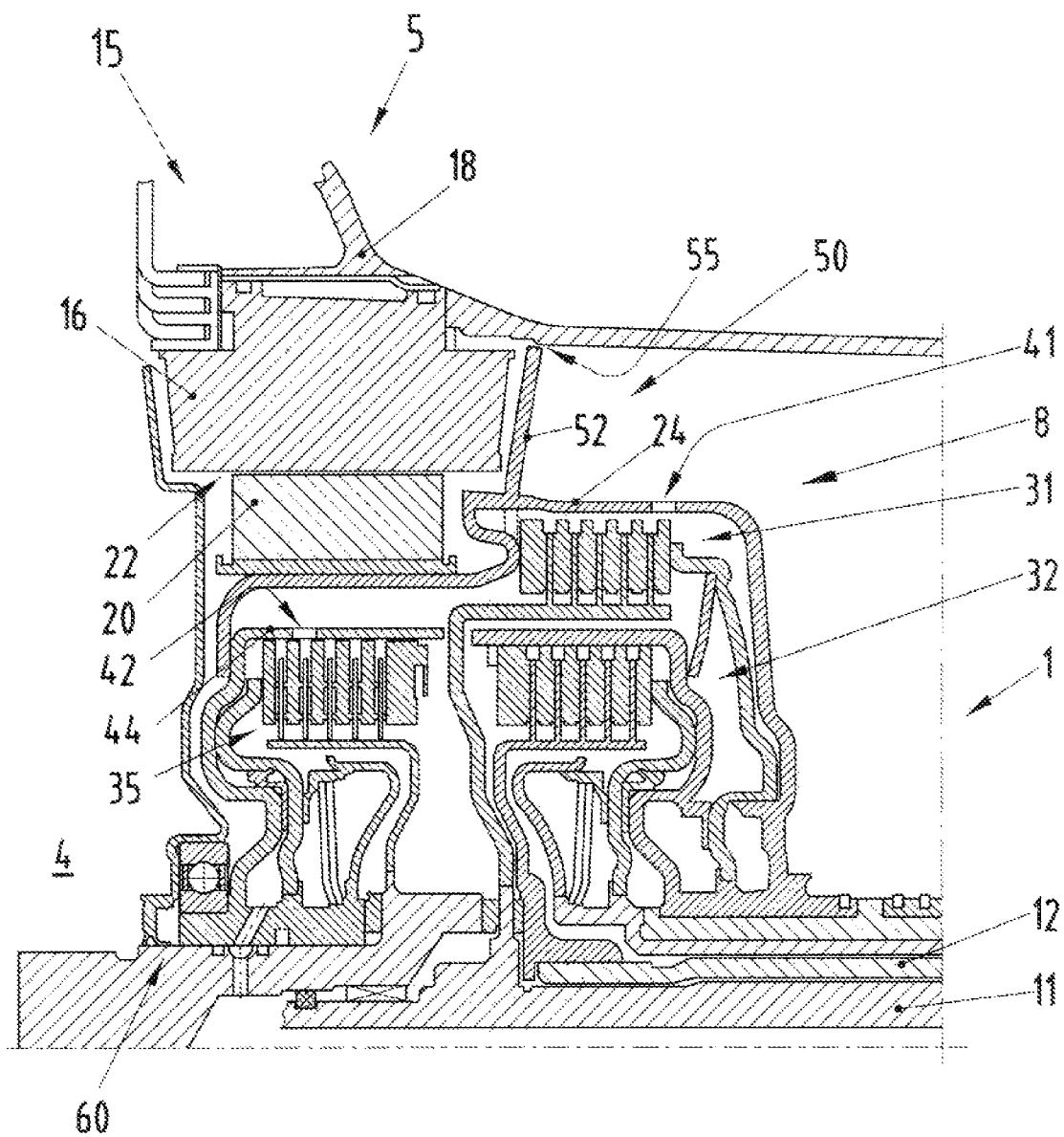

HYBRID DRIVE TRAIN

CROSS-REFERENCE TO RELATED APPLICATIONS

This application claims priority under 35 USC 119 to German Patent Application No. 10 2009 030 135.6 filed on Jun. 24, 2009 the entire disclosure of which is incorporated herein by reference.

BACKGROUND OF THE INVENTION

1. Field of the Invention

The invention relates to a hybrid drive train with an electric machine that has a stator fastened to a clutch housing and a rotor that can be rotated relative to the stator with a radial gap therebetween. The hybrid drive train also has a wet-running multiple disk clutch device with an outer multiple disk carrier and at least one oil passage opening.

2. Description of the Related Art

Drive trains with wet-running clutches and electric motors are disclosed, for example, in U.S. Pat. No. 6,354,974 B1, EP 1 112 884 B1, U.S. Pat. Nos. 6,736,228 B2, 7,293,637 B2, US 2007/0108857 A1, US 2007/0089962 A1 and WO 2008/092426 A2. It is possible to accommodate the electric motor in a dry space that is sealed by a sealing device with respect to a wet space that has the wet-running clutch. This is relatively complicated and expensive. Additionally, the oil that is used to cool the wet-running clutch also can be used to cool the electric motor. Of course, a coolant and/or lubricating medium other than oil can be used.

It is an object of the invention to provide a hybrid drive train that is of simple construction and can be produced inexpensively.

SUMMARY OF THE INVENTION

The invention relates to a hybrid drive train that has an electric machine with a stator fastened to a clutch housing and a rotor that can be rotated relative to the stator with a radial gap between the rotor and the stator. The hybrid drive also has a wet-running multiple disk clutch device with an outer multiple disk carrier that has at least one oil passage opening. The radial gap between the rotor and the stator is shielded from the oil passage opening of the outer multiple disk carrier by an oil shielding device. The oil shielding device preferably is not a sealing device and there preferably is no seal between the outer multiple disk carrier and the clutch housing.

The oil shielding device preferably extends from the outer multiple disk carrier into the vicinity of the clutch housing. "The vicinity" of means that the oil shielding device does not extend quite to the clutch housing.

The oil shielding device preferably is spaced slightly from the clutch housing in the radial direction. The spacing ensures that the oil shielding device does not contact the clutch housing, and therefore no friction occurs between the oil shielding device and the clutch housing. A slight passage of oil between the oil shielding device and the clutch housing is consciously accepted.

At least one oil passage gap is provided between the oil shielding device and the clutch housing and makes a slight passage of oil possible. This slight passage of oil between the oil shielding device and the clutch housing is delimited by corresponding dimensioning of the oil passage gap so that oil that passes through the oil passage gap and into the radial gap between the stator and the rotor does not impair operation of the electric machine.

The oil shielding device preferably comprises a shielding plate that extends radially to the outside from the outer multiple disk carrier. The size and design of the shielding plate may be adapted partially to the size and design of the stator and the rotor of the electric machine.

The shielding plate may be connected to the outer multiple disk carrier in one piece or in a material to material manner. The design of the outer multiple disk carrier is adapted partially to the design of the electric machine, and particularly to the design of the rotor and/or the stator.

The multiple disk clutch device preferably comprises two wet-running multiple disk clutches that couple the outer multiple disk carrier to a first or a second transmission input shaft to define a dual clutch.

The multiple disk clutch device preferably comprises a wet-running separating clutch of multiple disk design connected between a primary drive and the outer multiple disk carrier. The separating clutch interrupts a rotationally fixed connection between the primary drive, such as an internal combustion engine, and the outer multiple disk carrier.

The separating clutch preferably comprises an outer multiple disk carrier element with at least one oil passage opening. The outer multiple disk carrier is arranged, with the formation of an annular space, radially within the outer multiple disk carrier and the rotor of the electric machine. The separating clutch preferably overlaps the rotor of the electric machine in the axial direction.

Further advantages, features and details of the invention result from the following description, in which various exemplary embodiments are described in detail with reference to the drawing.

BRIEF DESCRIPTION OF THE DRAWING

The single appended FIGURE shows a hybrid drive train according to the invention in half section.

DETAILED DESCRIPTION OF THE PREFERRED EMBODIMENT

FIG. 1 shows a hybrid drive train 1 with primary and secondary drives 4 and 5. The two drives 4 and 5 optionally can be coupled to one of two transmission input shafts 11 and 12 via a wet-running multiple disk clutch device 8.

The secondary drive 5 includes an electric machine 15 with a stator 16 that is fastened to a clutch housing 18. The electric machine 15 also has a rotor 20 arranged rotatably radially within the stator 16 with a radial gap 22 therebetween. The rotor 20 is fastened to an outer multiple disk carrier 24 of the wet-running multiple disk clutch device 8.

The wet-running multiple disk clutch device 8 has a first wet-running multiple disk clutch 31 that connects the outer multiple disk carrier 24 to the first transmission input shaft 11 in a rotationally fixed manner. Furthermore, the wet-running multiple disk clutch device 8 has a second wet-running multiple disk clutch 32 that connects the outer multiple disk carrier 24 to the second transmission input shaft 12 in a rotationally fixed manner.

The wet-running multiple disk clutch device 8 also has a separating clutch 35 that can produce or interrupt a rotationally fixed connection between the primary drive 4 and the outer multiple disk carrier 24.

The outer multiple disk carrier 24 has at least one oil passage opening 41 radially outside the two multiple disk clutches 31, 32. At least one further oil passage opening 42 is provided on an outer multiple disk carrier element 44 of the separating clutch 35. The outer multiple disk carrier element 44 is connected fixedly to the outer multiple disk carrier 24.

Oil is guided past the multiple disks for cooling during operation of the two multiple disk clutches 31, 32 and the separating clutch 35. Thus, oil emerges through the oil passage opening 41 out of the wet-running multiple disk clutch device 8 and passes into an annular space that extends between the outer multiple disk carrier 24 and the clutch housing 18 and in which the electric machine 15 is arranged.

An oil shielding device 50 is attached to the outer multiple disk carrier 24 to prevent the oil that emerges through the oil passage opening 41 from passing unimpeded into the radial gap 22 between the rotor 20 and the stator 16.

The oil shielding device 50 has a shielding plate 52 which, in the vicinity of the stator 16, extends from the outer multiple disk carrier 24 radially to the outside toward the clutch housing 18. A radially outer circumferential edge of the shielding plate 52 is a substantially circular annular disk that is spaced apart slightly from the clutch housing 18 to form an oil passage gap 55.

The arrangement and the dimensions of the oil passage gap 55 between the shielding plate 52 and the clutch housing 18 are selected so that only a very low proportion of the oil that emerges at the oil passage opening 41 out of the multiple disk clutch device 8 passes into the radial gap 22, to be precise preferably in the form of oil mist.

The open design of the clutch device 8 with the oil passage openings 41, 42 enables the cooling oil to be centrifuged away radially to the outside due to the rotation during operation of the hybrid drive train 1. As a result, undesired drag losses in the multiple disk clutch device 8 can be minimized.

The oil shielding device 50 of the invention enables the rotor 20 to be kept free of the oil that emerges through the oil passage opening 41 to prevent undesired splashing. In comparison, the above-referenced conventional solutions, a middle course as it were is taken in the context of the invention. The electric machine 15 is neither free of oil nor does cooling oil flow through it in a targeted manner.

A bearing device 60 prevents undesired discharging of cooling oil out of the multiple disk clutch device 8 in the direction of the primary drive 4. Additionally, the oil shielding device 50 shields the electric machine 15 on the side that faces away from the primary drive 4. As a result, the shielding plate 52 minimizes the passage of oil through the gap 55 in the region of the electric machine 15.

As an alternative or in addition, a corresponding projection can be provided on the clutch housing 18 or a labyrinth can be provided between the outer multiple disk carrier 24 and the clutch housing 18. The oil shielding device 50 of the invention leads to the electric machine 15 being operated in the oil mist. This results in a relatively simple construction, with simultaneously minimized drag losses at the wet-running multiple disk clutch device 8.

What is claimed is:

1. A hybrid drive train having an electric machine with a stator fastened to a clutch housing and a rotor that can be rotated relative to the stator, a radial gap being defined between the stator and the rotor, a wet-running multiple disk clutch device with an outer multiple disk carrier disposed radially inward of the clutch housing and at least one wet-running multiple disk clutch disposed inward of the outer multiple disk carrier, the outer multiple disk carrier having at least one oil passage opening to accommodate a flow of oil for cooling the wet-running multiple disk clutch, and an oil shielding device at a position on the outer multiple disk carrier between the oil passage opening and both the rotor and the stator, the oil shielding device comprising a shielding plate extending radially out from the outer multiple disk carrier toward the clutch housing and to a position radially outward of the gap between the rotor and the stator for shielding the radial gap between the rotor and the stator from the oil passage opening of the outer multiple disk carrier.

2. The hybrid drive train of claim 1, wherein the shielding plate is integral or unitary with the outer multiple disk carrier.

3. The hybrid drive train of claim 1, wherein the at least one wet-running multiple disk of the multiple disk clutch device comprises two wet-running multiple disk clutches coupling the outer multiple disk carrier to a first or a second transmission input shaft.

4. The hybrid drive train of claim 3, wherein the multiple disk clutch device comprises a wet-running separating clutch having multiple disks and connected between a primary drive and the outer multiple disk carrier.

5. The hybrid drive train of claim 4, wherein the separating clutch comprises an outer multiple disk carrier element with at least one oil passage opening and an annular space being formed radially within the outer multiple disk carrier element and the rotor of the electric machine.

6. The hybrid drive train of claim 5, wherein the separating clutch overlaps the rotor of the electric machine in an axial direction.

7. A hybrid drive train having an electric machine with a stator fastened to a clutch housing and a rotor that can be rotated relative to the stator, a radial gap being defined between the stator and the rotor, a wet-running multiple disk clutch device with an outer multiple disk carrier disposed radially inward of the clutch housing and at least one wet-runninq multiple disk clutch disposed inward of the outer multiple disk carrier, the outer multiple disk carrier having at least one oil passage opening to accommodate a flow of oil for cooling the wet-running multiple disk clutch, and an oil shielding device at a position on the outer multiple disk carrier between the oil passage opening and both the rotor and the stator, wherein the oil shielding device comprises a shielding plate that extends from a position on the outer multiple disk carrier radially inward of the gap between the rotor and the stator to a position radially outward of the gap between the rotor and the stator for shielding the radial gap between the rotor and the stator from the oil passage opening of the outer multiple disk carrier.

* * * * *